US012216094B2

(12) United States Patent
Bradshaw

(10) Patent No.: US 12,216,094 B2
(45) Date of Patent: Feb. 4, 2025

(54) MATERIAL TESTING SYSTEMS INCLUDING IMPROVED COMPONENT COOLING

(71) Applicant: Illinois Tool Works Inc., Glenview, IL (US)

(72) Inventor: Nicholas H. Bradshaw, Haverhill, MA (US)

(73) Assignee: Illinois Tool Works Inc., Glenview, IL (US)

( * ) Notice: Subject to any disclaimer, the term of this patent is extended or adjusted under 35 U.S.C. 154(b) by 367 days.

(21) Appl. No.: 17/877,407

(22) Filed: Jul. 29, 2022

(65) Prior Publication Data

US 2023/0039676 A1    Feb. 9, 2023

Related U.S. Application Data

(60) Provisional application No. 63/228,914, filed on Aug. 3, 2021.

(51) Int. Cl.
*G01N 3/06* (2006.01)

(52) U.S. Cl.
CPC ....... *G01N 3/06* (2013.01); *G01N 2203/0017* (2013.01); *G01N 2203/0019* (2013.01);
(Continued)

(58) Field of Classification Search
CPC .......................... G01N 3/06; G01N 2203/0025
See application file for complete search history.

(56) References Cited

U.S. PATENT DOCUMENTS

| 11,747,247 B2* | 9/2023 | Canal Vila | G01N 3/02 73/37 |
| 2020/0191702 A1 | 6/2020 | Williams | |

(Continued)

FOREIGN PATENT DOCUMENTS

| CN | 202229975 | 5/2012 |
| CN | 103674726 | 3/2014 |

(Continued)

OTHER PUBLICATIONS

Int'l Search Report and Written Opinion ApplN No. PCT/US2022/038992 mailed Apr. 19, 2023.

*Primary Examiner* — Eric S. McCall
(74) *Attorney, Agent, or Firm* — McAndrews, Held & Malloy, Ltd.

(57) ABSTRACT

An example material testing machine includes: a first crosshead; a first drive shaft configured to move the first crosshead when actuated; a housing comprising an air inlet and an air outlet; a drive motor within the housing and configured to actuate the first drive shaft; a motor drive circuit configured to provide electrical power to the drive motor; and a motor drive cooling system configured to cool the motor drive circuit, the motor drive cooling system comprising: a cooling fan configured to generate an airflow from the air inlet of the housing to the air outlet of the housing, wherein a total surface area of the air outlet is greater than a total surface area of the air inlet such that an air pressure of the airflow decreases from the air inlet towards the air outlet; a duct configured to direct a path of the airflow between the air inlet and the air outlet; and a heat sink thermally coupled to the motor drive circuit and positioned within the airflow in the duct.

9 Claims, 4 Drawing Sheets

(52) U.S. Cl.
CPC ............... *G01N 2203/0021* (2013.01); *G01N 2203/0023* (2013.01); *G01N 2203/0025* (2013.01)

(56) References Cited

U.S. PATENT DOCUMENTS

| | | | |
|---|---|---|---|
| 2020/0309651 A1* | 10/2020 | Conti | G01N 3/08 |
| 2021/0033510 A1* | 2/2021 | Pope | G01N 3/62 |
| 2021/0096662 A1* | 4/2021 | Riddick | H01H 19/001 |
| 2021/0247281 A1* | 8/2021 | Tremblay | G01N 3/10 |
| 2022/0107250 A1* | 4/2022 | Giovanoni | G01N 3/08 |
| 2022/0113234 A1* | 4/2022 | Tremblay | G01N 3/22 |
| 2022/0228957 A1* | 7/2022 | Riddick | G01N 3/08 |
| 2022/0229079 A1* | 7/2022 | Riddick | G01N 35/00029 |
| 2023/0171343 A1* | 6/2023 | Fry | G01N 3/62 |
| | | | 705/305 |
| 2024/0159633 A1* | 5/2024 | Levis | G01N 3/02 |
| 2024/0175793 A1* | 5/2024 | Hollander | G11C 16/0483 |
| 2024/0219414 A1* | 7/2024 | Morse | G01N 3/00 |
| 2024/0229751 A1* | 7/2024 | Levy | G01M 99/007 |
| 2024/0280599 A1* | 8/2024 | Morse | G01N 35/00732 |
| 2024/0295425 A1* | 9/2024 | Euston | G01F 22/00 |

FOREIGN PATENT DOCUMENTS

| | | |
|---|---|---|
| CN | 209961615 | 1/2020 |
| CN | 110749509 | 2/2020 |
| CN | 111077026 | 4/2020 |
| CN | 111855456 | 10/2020 |
| CN | 112113853 | 12/2020 |
| CN | 212134374 | 12/2020 |
| CN | 113063689 | 7/2021 |
| CN | 213779747 | 7/2021 |
| KR | 20130068099 | 6/2013 |

* cited by examiner

MATERIAL TESTING SYSTEMS INCLUDING IMPROVED COMPONENT COOLING

FIELD OF THE DISCLOSURE

This disclosure relates generally to materials testing, and more particularly, to material testing systems including improved component cooling.

BACKGROUND

Universal testing machines are used to perform mechanical testing, such as compression strength testing or tension strength testing, on materials or components. Such testing machines may use motors and electric motor driving circuits that produce a high amount of power or torque. As such, electric motor driving circuits can be generate substantial heat during operation.

SUMMARY

Material testing systems including improved component cooling are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
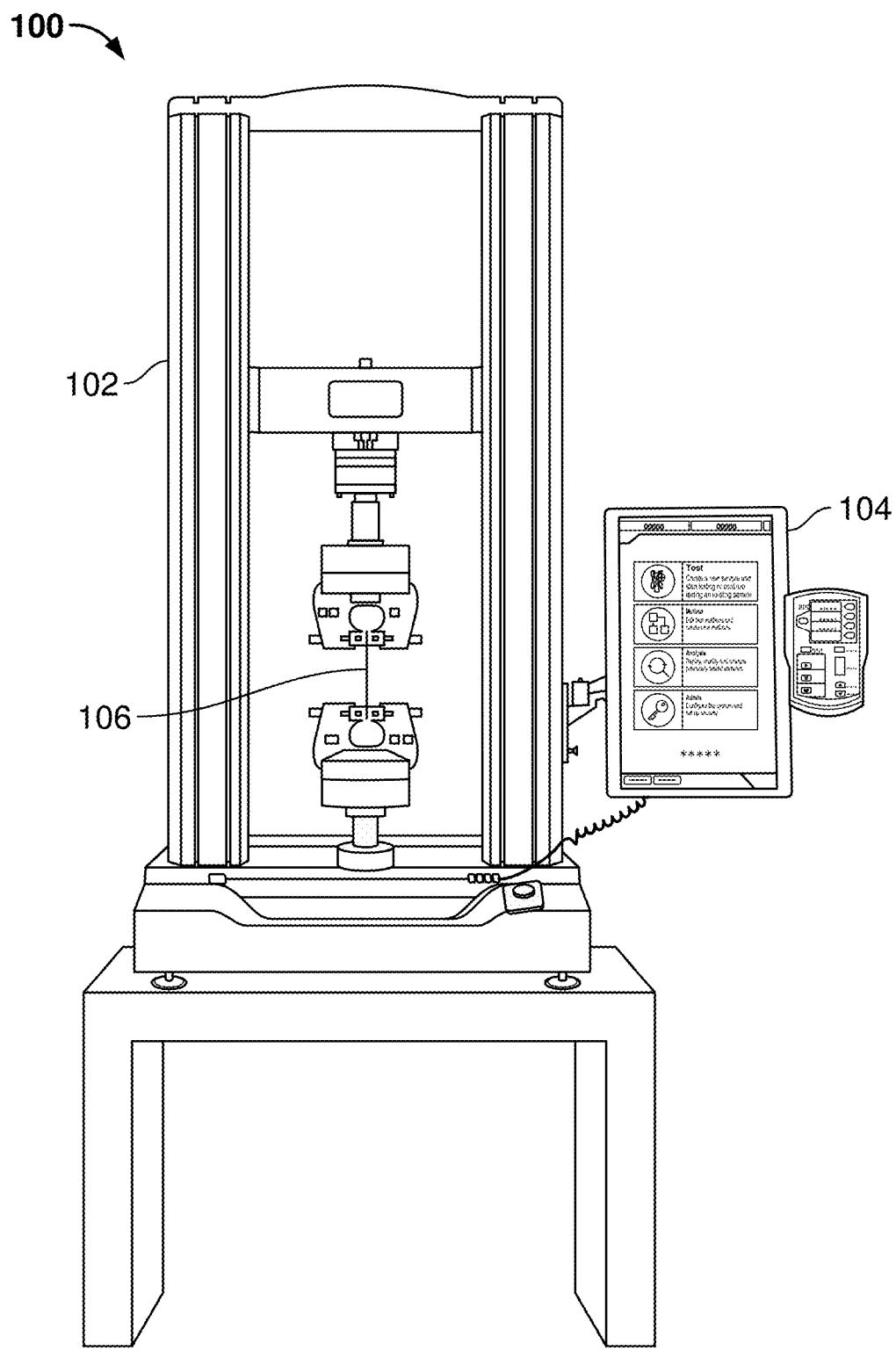
FIG. 1 is an example testing device to perform mechanical property testing, in accordance with aspects of this disclosure.

Conventional material testing systems include electronics, such as high-powered servo motor drive or power amplifiers, which produce significant heat. Such electronics can also be sensitive to the introduction of different types of dust, particulates, and/or other airborne contamination. While sealing of cooling systems can prevent entry of such dust or particulates from the cooling system to the volume containing the electronics, such sealing can be expensive and/or introduce design complexities.

Disclosed example material testing systems include a forced air cooling system to cool heat-generating components, while reducing or eliminating introduction of dust or contaminants to the electronics from the cooling system and without requiring sealing of the cooling system. In disclosed example material testing systems, a cooling system includes a duct attached to a housing, which define a cooling path between an air inlet in the housing and an air outlet in the housing. In some examples, the air inlet faces downwards so that dust and contaminants cannot readily settle into the air inlet, and the air inlet is not likely to collect dust unless the dust is airborne. The most problematic dust or contaminants for electronic components, such as metal scale and/or conductive fibers, are generally heavy and tend to settle downwards. The downward-facing air inlet of disclosed examples reduces or prevents heavier dust or particulates from being drawn into the air inlet.

In disclosed examples, there is more surface area at the air outlet than at the air inlet. The increase in surface area results in a pressure drop, rather than a pressure increase, in the air flow path from the air inlet to the air outlet. Because of the pressure drop, dust that enters the air inlet will more readily exit out the exhaust rather than through any unsealed gaps in the duct when the duct is not sealed.

Disclosed example material testing systems further include a heatsink thermally coupled to the electronics components to be cooled, and the air flow path over the heatsink within the cooling system is enclosed in a thermally-conductive duct. The thermally-conductive duct may be arranged in such a way that the air flow path is substantially isolated from the rest of the electronic components of the system, so any airborne dust that does happen to be drawn into the intake is harmlessly discharged out the air exhaust without making contact with other components of the material testing system.

Disclosed example material testing systems are described below with reference to cooling a motor drive circuit. However, the example cooling systems disclosed herein may also or alternatively be used to cool other circuits while limiting ingress of dust or contaminants to the housing or frame of the material testing system.

As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system.

Disclosed example material testing machines include: a first crosshead; a first drive shaft configured to move the first crosshead when actuated; a housing comprising an air inlet and an air outlet; a drive motor within the housing and configured to actuate the first drive shaft; a motor drive circuit configured to provide electrical power to the drive motor; and a motor drive cooling system configured to cool the motor drive circuit, the motor drive cooling system comprising: a cooling fan configured to generate an airflow from the air inlet of the housing to the air outlet of the housing, wherein a total surface area of the air outlet is greater than a total surface area of the air inlet such that an air pressure of the airflow decreases from the air inlet towards the air outlet; a duct configured to direct a path of the airflow between the air inlet and the air outlet; and a heat sink thermally coupled to the motor drive circuit and positioned within the airflow in the duct.

In some example material testing machines, wherein the air inlet is positioned facing downward to draw air in from underneath the air inlet. In some example material testing machines, the duct is not sealed against a remainder of the interior of the housing. In some example material testing machines, the air inlet and the air outlet are oriented at an angle between 0 degrees and 135 degrees.

In some example material testing machines, the cooling fan is positioned immediately adjacent the air inlet to draw air in through the air inlet. In some example material testing machines, the motor drive circuit is physically connected to the heat sink via one or more thermally conductive layers. In some example material testing machines, the one or more thermally conductive layers include the duct.

In some example material testing machines, the duct is configured to physically support the motor drive circuit within the housing. In some example material testing machines, the first crosshead, the first drive shaft, and the drive motor are configured to perform at least one of compression strength testing, tension strength testing, shear strength testing, bend strength testing, deflection strength testing, tearing strength testing, peel strength testing, or torsional strength testing on a specimen coupled to the first crosshead.

FIG. 1 is an example material testing system 100 to perform mechanical property testing. The example material testing system 100 may be, for example, a universal testing system capable of static mechanical testing. The material testing system 100 may perform, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally or alternatively, the material testing system 100 may perform dynamic testing.

The example material testing system 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106. While the example test fixture 102 is illustrated as a dual column fixture, other fixtures may be used, such as single-column test fixtures.

The example computing device 104 may be used to configure the test fixture 102, control the test fixture 102, and/or receive measurement data (e.g., transducer measurements such as force and displacement) and/or test results (e.g., peak force, break displacement, etc.) from the test fixture 102 for processing, display, reporting, and/or any other desired purposes.

Figure 2:
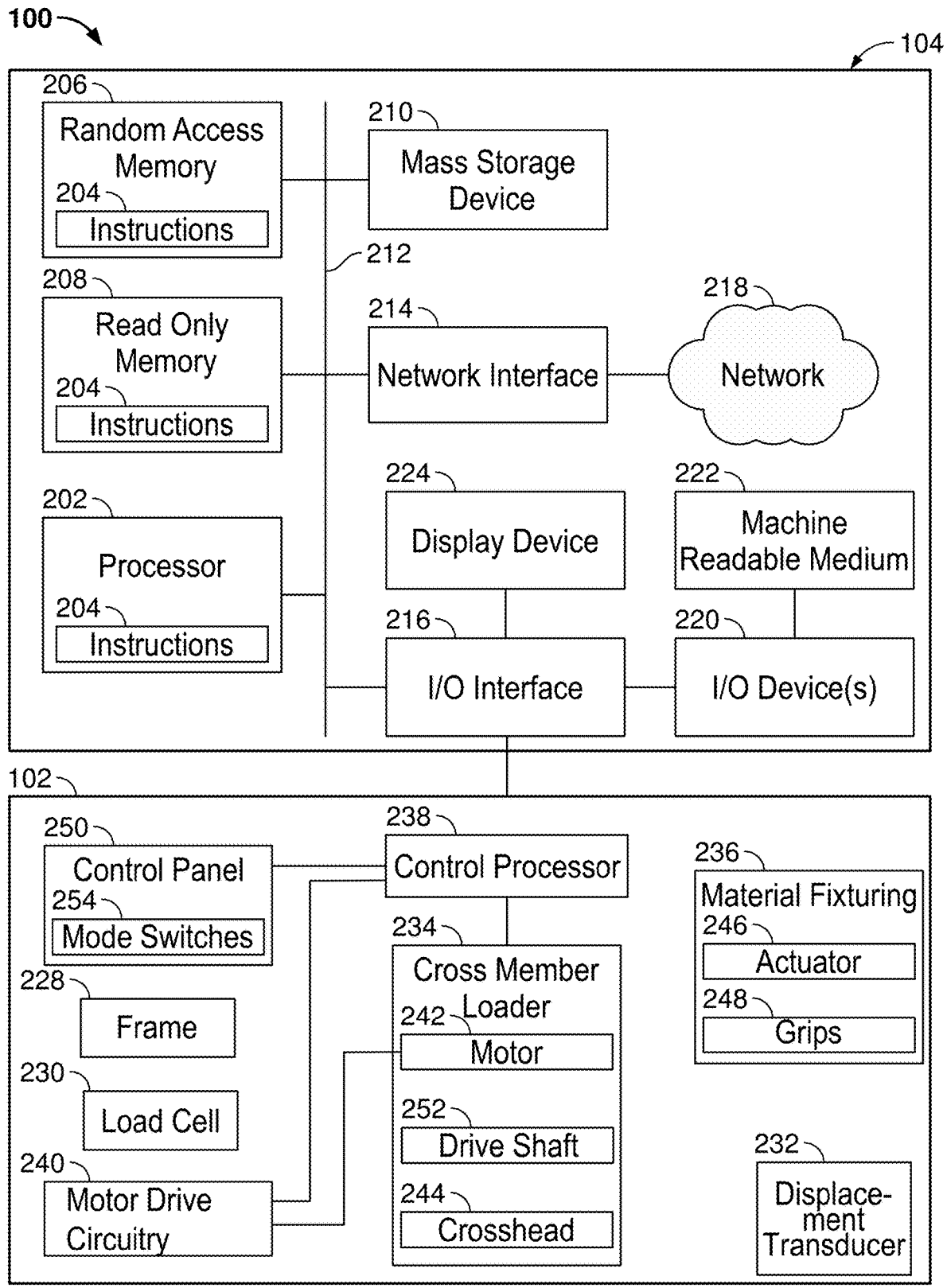
FIG. 2 is a block diagram of an example implementation of the testing device of FIG. 1.

FIG. 2 is a block diagram of an example implementation of the material testing system 100 of FIG. 1. The example material testing system 100 of FIG. 2 includes the test fixture 102 and the computing device 104. The example computing device 104 may be a general-purpose computer, a laptop computer, a tablet computer, a mobile device, a server, an all-in-one computer, and/or any other type of computing device.

The example computing device 104 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing device 104 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example material testing system 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing device 104 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example material testing system 100 of FIG. 1 further includes the test fixture 102 coupled to the computing device 104. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 and/or to the I/O interface 216 via a wired or wireless connection (e.g., Ethernet, Wi-Fi, etc.), either directly or via the network 218.

The test fixture 102 of FIG. 2 includes a frame 228, a load cell 230, a displacement transducer 232, a cross-member loader 234, material fixtures 236, a control processor 238, and motor drive circuitry 240. The frame 228 provides rigid structural support for the other components of the test fixture 102 that perform the test. The load cell 230 measures force applied to a material under test by the cross-member loader 234 via the grips 236. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the material testing system 100 include electric motors, pneumatic actuators, hydraulic actuators, piezoelectric actuators, relays, and/or switches. The motor drive circuitry 240 is controlled by the control processor 238 to provide electrical power to the motor 242 based on control inputs and/or parameters.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The example control processor 238 communicates with the computing device 104 to, for example, receive test parameters from the computing device 104 and/or report measurements and/or other results to the computing device 104. For example, the control processor 238 may include one or more communication or I/O interfaces to enable communication with the computing device 104. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example material testing system 100 of FIG. 2 may further include one or more control panels 250, including buttons, switches, and/or other input devices located on an operator control panel. For example, the mode switches 254 may include buttons that control the motor 242 to jog (e.g., position) the crosshead 244 at a particular position on the frame 228, and/or switches (e.g., foot switches) that control the grip actuators 246 to close or open the pneumatic grips 248, and/or other input devices to select parameters for a material test.

The example motor 242 is connected to the crosshead 244 via one or more drive shafts 252. The motor 242 actuates the drive shaft 252 based on power provided by the motor drive circuitry 240 to, for example, raise or lower the crosshead 244. The crosshead 244 may be further stabilized by one or more other shafts or structures to apply force to a specimen in a controlled way.

Figure 3:
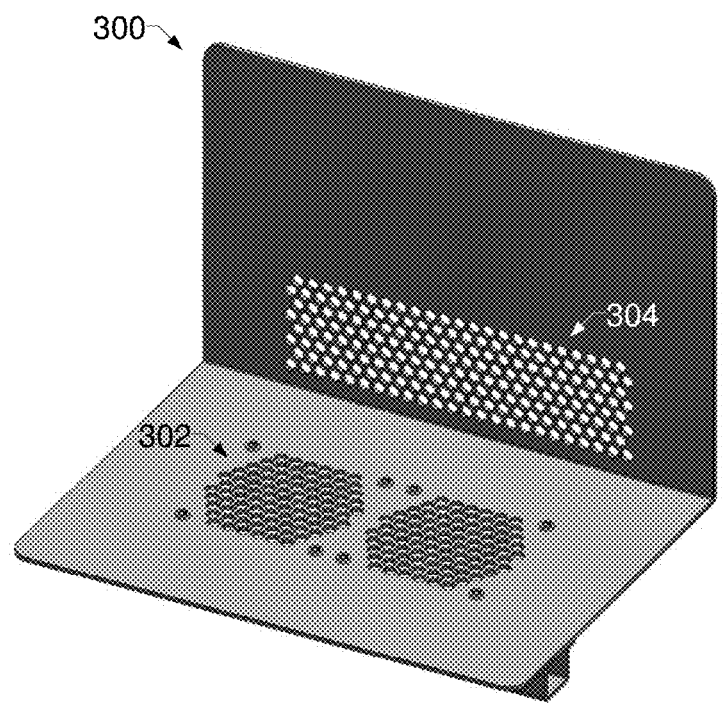
FIG. 3 illustrates a portion of an example housing for components of the testing device of FIGS. 1 and 2.

FIG. 3 illustrates a portion of an example housing 300 for components of the testing system 100 of FIGS. 1 and 2. The example housing 300 may implement all or a portion of the frame 228 of FIG. 2, and/or any other frame or housing of the testing system 100. The example housing includes an air inlet 302 and an air outlet 304. The air inlet 302 may be sized and/or shaped to have intake cooling fans mounted adjacent the air inlet 302.

As illustrated in FIG. 3, the air outlet 304 has a larger surface area than the air inlet 302. As a result of the intake cooling fans being positioned adjacent the air inlet 302 and the increase in surface area from the air inlet 302 to the air outlet 304, the pressurization of the airflow drops from the air inlet 302 toward the air outlet 304. The air inlet 302 and the air outlet 304 are configured at a 90 degree angle in the example of FIG. 3. However, the air inlet and the air outlet 304 may be arranged at any angle between zero degrees (e.g., the air outlet is also facing downwards on the housing 300) and 135 degrees.

Figure 4:
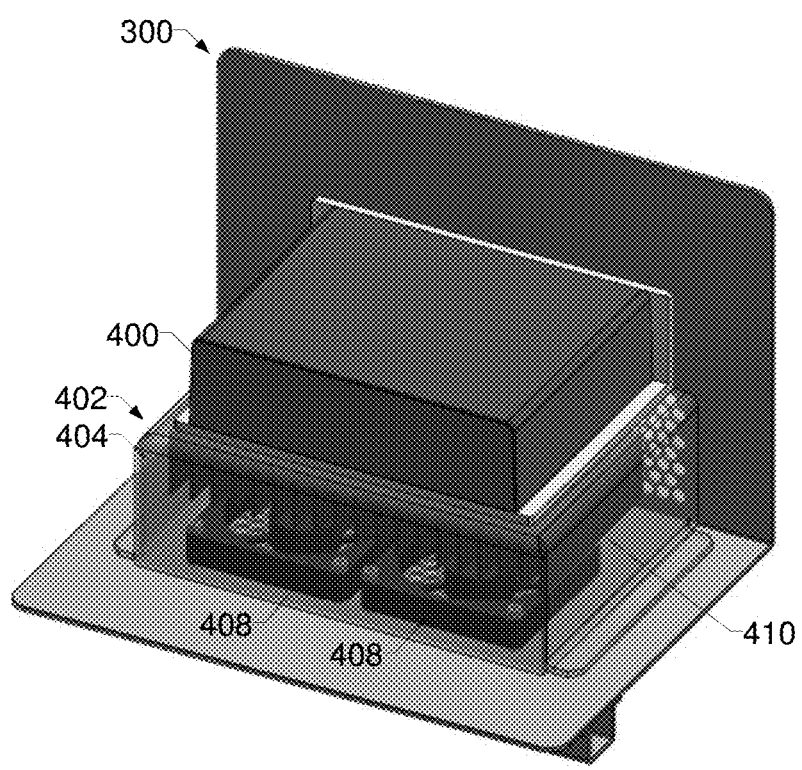
FIG. 4 illustrates an example motor driving circuit and motor driving circuit cooling system installed in the housing of FIG. 3.
Figure 5:
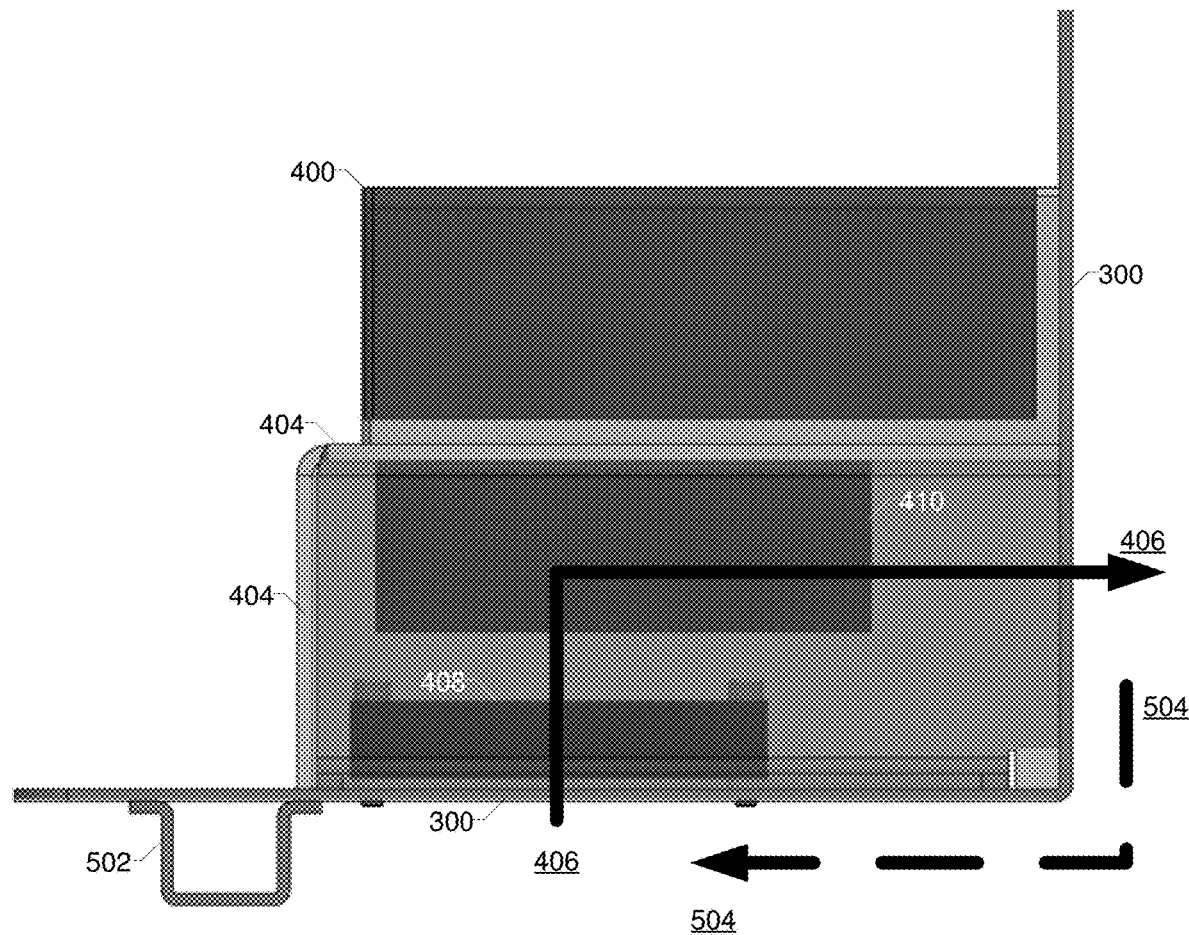
FIG. 5 is a side cross-sectional view of the example motor driving circuit cooling system of FIG. 4, illustrating an example airflow through the motor driving circuit cooling system.

FIG. 4 illustrates an example motor driving circuit 400 and motor driving circuit cooling system 402 installed in the housing 300 of FIG. 3. FIG. 5 is a side cross-sectional view of the example motor driving circuit cooling system 402 of FIG. 4, illustrating an example airflow through the motor driving circuit cooling system 402. The example motor driving circuit 400 may implement the motor drive circuitry 240 of FIG. 2 to drive one or more motors 242 and/or other actuators.

As illustrated in FIGS. 4 and 5, the motor driving circuit cooling system 402 includes a duct 404 which, in combination with the housing 300, directs an airflow 406 from the air inlet 302 to the air outlet 304. In the example of FIGS. 4 and 5, the duct 404 is not sealed, or not completely sealed, against the housing 300. Cooling fans 408 are attached or mounted to the housing 300 adjacent the air inlet 302, and pull air into the air inlet 302 to generate the airflow 406.

A heat sink 410 is mounted within the duct 404 such that the airflow 406 is directed to cool the heat sink 410. The heat sink 410 is thermally coupled to the motor driving circuit 400 via the duct 404. The duct 404 and/or a housing of the motor driving circuit 400 are constructed using thermally conductive materials, such as aluminum, copper, or any other thermally conductive material. In some examples, there may be additional thermally conductive layers between the motor driving circuit 400 and the heat sink. The thermally conductive layers may be in series combination with the duct 404 and/or provide a parallel thermal path to the duct 404. In the example of FIGS. 4 and 5, the duct 404 provides at least partial structural support to the motor driving circuit 400 and to the heat sink 410, such that the motor driving circuit 400 transfers heat to the heat sink 410 via the duct 404. The motor driving circuit 400 may also be at least partially supported by the housing 300.

As illustrated in FIG. 5, the housing 300 includes feet 502 or other spacing structures to provide clearance between the downward-facing air inlets 302 and a surface on which the housing 300 is placed. The feet 502 permit adequate air to be drawn in through the air inlet 302 via the cooling fans 408. In some examples, the feet 502 create sufficient clearance between the air inlet 302 and the surface, such that the air inlet flow 504 (e.g., flow created by the cooling fans 408) is unable or unlikely to draw in problematic contaminants, such as metal scale and/or conductive fibers, from the surface into the air inlet 302.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A material testing machine, comprising:
   a first crosshead;
   a first drive shaft configured to move the first crosshead when actuated;
   a housing comprising an air inlet and an air outlet;
   a drive motor within the housing and configured to actuate the first drive shaft;
   a motor drive circuit configured to provide electrical power to the drive motor; and
   a motor drive cooling system configured to cool the motor drive circuit, the motor drive cooling system comprising:
      a cooling fan configured to generate an airflow from the air inlet of the housing to the air outlet of the housing, wherein a total surface area of the air outlet is greater than a total surface area of the air inlet such that an air pressure of the airflow decreases from the air inlet towards the air outlet;
      a duct configured to direct a path of the airflow between the air inlet and the air outlet; and
      a heat sink thermally coupled to the motor drive circuit and positioned within the airflow in the duct.

2. The material testing machine of claim 1, wherein the air inlet is positioned facing downward to draw air in from underneath the air inlet.

3. The material testing machine of claim 1, wherein the duct is not sealed against a remainder of the interior of the housing.

4. The material testing machine of claim 1, wherein the air inlet and the air outlet are oriented at an angle between 0 degrees and 135 degrees.

5. The material testing machine of claim 1, wherein the cooling fan is positioned immediately adjacent the air inlet to draw air in through the air inlet.

6. The material testing machine of claim 1, wherein the motor drive circuit is physically connected to the heat sink via one or more thermally conductive layers.

7. The material testing machine of claim 6, wherein the one or more thermally conductive layers comprise the duct.

8. The material testing machine of claim 1, wherein the duct is configured to physically support the motor drive circuit within the housing.

9. The material testing machine of claim 1, wherein the first crosshead, the first drive shaft, and the drive motor are configured to perform at least one of compression strength testing, tension strength testing, shear strength testing, bend strength testing, deflection strength testing, tearing strength testing, peel strength testing, or torsional strength testing on a specimen coupled to the first crosshead.

* * * * *